United States Patent
Nilsson et al.

(10) Patent No.: US 9,940,733 B2
(45) Date of Patent: Apr. 10, 2018

(54) VIRTUAL MEMORY SUPPORTED COMPRESSION CONTROL SURFACES

(71) Applicant: Intel Corporation, Santa Clara, CA (US)

(72) Inventors: Jim K. Nilsson, Lund (SE); Tomas G. Akenine-Moller, Lund (SE)

(73) Assignee: Intel Corporation, Santa Clara, CA (US)

(*) Notice: Subject to any disclaimer, the term of this patent is extended or adjusted under 35 U.S.C. 154(b) by 149 days.

(21) Appl. No.: 14/315,435

(22) Filed: Jun. 26, 2014

(65) Prior Publication Data

US 2015/0379737 A1    Dec. 31, 2015

(51) Int. Cl.
*G06T 9/00* (2006.01)
*G06T 1/60* (2006.01)

(52) U.S. Cl.
CPC . *G06T 9/00* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 6,266,753 B1 * | 7/2001 | Hicok | | G06F 12/1081 345/555 |
| 6,557,083 B1 * | 4/2003 | Sperber | | G06F 12/0875 711/118 |
| 6,879,266 B1 * | 4/2005 | Dye | | G06F 12/08 341/51 |
| 8,862,823 B1 * | 10/2014 | Glasco | | G06F 12/0848 711/118 |
| 9,208,082 B1 * | 12/2015 | Cheriton | | G06F 12/06 |
| 9,317,301 B2 * | 4/2016 | Henry | | G06F 9/265 |
| 2002/0101367 A1 | 8/2002 | Geiger | | |
| 2002/0152247 A1 * | 10/2002 | Sirtori | | H04N 19/00 708/203 |
| 2003/0028387 A1 | 2/2003 | Kilbank | | |
| 2003/0163328 A1 | 8/2003 | Rambo | | |
| 2009/0160857 A1 * | 6/2009 | Rasmusson | | G06T 15/04 345/422 |
| 2010/0077133 A1 | 3/2010 | Jeon | | |
| 2011/0072235 A1 * | 3/2011 | Deming | | G06F 12/1027 711/207 |

(Continued)

FOREIGN PATENT DOCUMENTS

| CN | 101896941 A | 11/2010 |
|---|---|---|
| EP | 1962429 A1 | 8/2008 |

OTHER PUBLICATIONS

Pekhimenko, Gennady, et al. "Linearly compressed pages: a low-complexity, low-latency main memory compression framework." Proceedings of the 46th Annual IEEE/ACM International Symposium on Microarchitecture. ACM, 2013.*

(Continued)

*Primary Examiner* — Yu Chen
(74) *Attorney, Agent, or Firm* — Trop Pruner & Hu, P.C.

(57) ABSTRACT

Data destined for memory, i.e., data that was evicted at some level in the cache hierarchy is intercepted and subjected to compression before being sent to memory. Thereby, when the compression is successful, the memory bandwidth requirement is reduced, potentially resulting in higher performance and/or energy efficiency in some embodiments.

23 Claims, 5 Drawing Sheets

(56) References Cited

U.S. PATENT DOCUMENTS

| | | | | |
|---|---|---|---|---|
| 2011/0087840 A1* | 4/2011 | Glasco | ............... | G06F 12/08 |
| | | | | 711/118 |
| 2011/0116723 A1* | 5/2011 | Rasmusson | ............ | G06T 9/004 |
| | | | | 382/238 |
| 2011/0243469 A1* | 10/2011 | McAllister | ............... | G06T 9/00 |
| | | | | 382/239 |
| 2015/0242432 A1* | 8/2015 | Bak | ............... | G06F 12/1009 |
| | | | | 707/693 |

OTHER PUBLICATIONS

PCT International Search Report and Written Opinion dated Sep. 18, 2015 in application No. PCT/US2015/036343 (12 pages).

TW Search Report dated Feb. 19, 2016 in corresponding TW application No. 104115913 (2 pages).

JP office action issued in corresponding JP application 2016-573029 dated Jan. 9, 2018 (6 pages).

\* cited by examiner

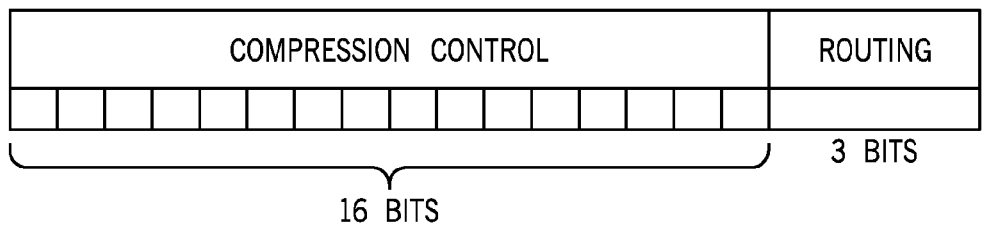

VIRTUAL MEMORY SUPPORTED COMPRESSION CONTROL SURFACES

BACKGROUND

In modern computer systems, data traffic on or off of an integrated circuit chip to external memory is a major performance bottleneck, and consumes a significant portion of the dissipated system energy. As such, memory bandwidth requirements can limit the thermal design point (TDP) of the system and inhibit performance scaling. Through the use of cache hierarchies, a lot of this memory traffic is avoided, as the most recently used data can be found close to the processor (e.g., a central processing unit (CPU) or graphics processing unit (GPU)). However, even with infinite caches, compulsory cache misses lead to memory traffic.

Current systems can only compress data from certain caches and the compressed data is not handled in a uniform way by the CPU and the GPU. For example, if the GPU can compress parts of a render target and if the CPU later wants to read that render target, then the entire render target needs to be decompressed and sent to the caches in the CPU.

Previous methods rely on specific handling of compression for specific types of data. This is necessary because of the nature of compression—different types of data lend themselves differently to various methods of compression. However, previous methods also handle compression control specifically and separately, making it hard (in terms of design and validation) to introduce compression at new locations in the system.

BRIEF DESCRIPTION OF THE DRAWINGS

Some embodiments are described with respect to the following figures:

FIG. 1 is a depiction of compression control for one embodiment;

FIG. 2 is a TLB layout for one embodiment;

DETAILED DESCRIPTION

Figure 3:
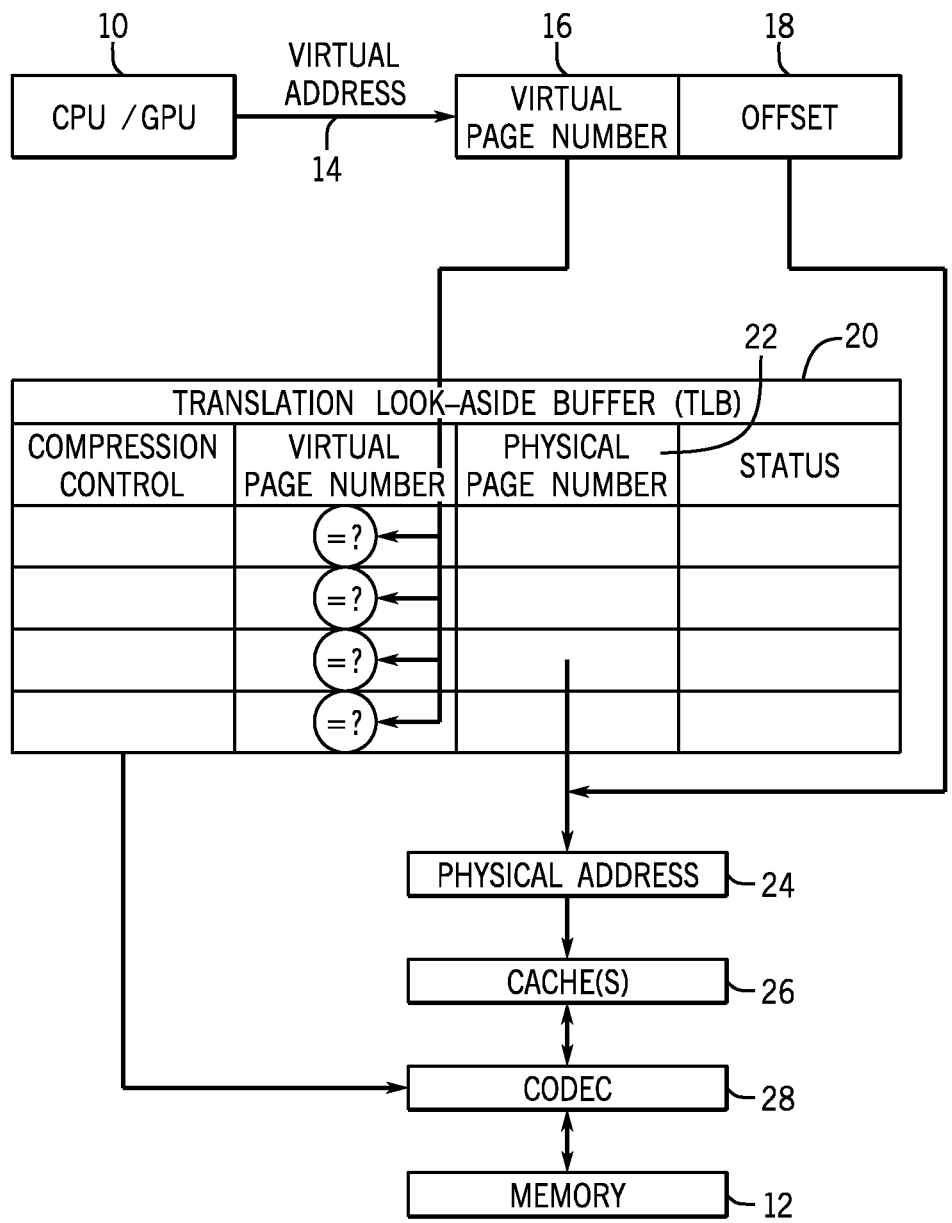
FIG. 3 is a schematic depiction for one embodiment.

Data destined for memory, namely, data that was evicted at some level in the cache hierarchy, is intercepted and subjected to compression before being sent to memory. When the compression is successful, the memory bandwidth requirement is reduced, potentially resulting in higher performance and/or energy efficiency in some embodiments.

Existing data structures and hardware mechanisms, (i.e., translation lookaside buffers (TLBs)), that are part of the virtual memory system are augmented with compression control data. Data structures may be augmented in the operating system, for example in page tables and elsewhere. Compression control data in one simple form may include the following per page table and TLB entry: (i) a bit-vector with a single bit per compressible unit (described below) to signal if the corresponding unit is compressed or not, and (ii) codec routing information, i.e., an identification of which compressor was used to compress the data. If certain data is used in a way that implicitly identifies the codec to use, then the codec routing information is not needed.

A common, single mechanism called compression control may be used to signal compression. With that mechanism in place, new types of compression may be handled by introducing new codecs at appropriate locations. With common compression control, it is also easy to maintain compression in a shared memory system, for example, where data is shared between a CPU and a GPU. In this case, compression control accompanies the address mappings and only accessed data needs to be uncompressed. There is no need in some embodiments to decompress all data before sharing it with another entity, as in present architectures.

The memory page sizes and memory line sizes, described below are not limiting and other sizes may also be used. Additionally, compression is assumed to work on an integer number of memory transactions (memory lines), e.g., 2:N, 4:N, or 8:N compression (M:N in the general case), meaning that two, four, or eight memory lines, respectively, can be compressed to less memory lines. M memory lines may be treated as a compressible unit.

For a simple case, 2:N compression, one bit for every two memory lines signals whether this compressible unit is indeed compressed (down to 50%) or not. For 4:N compression, four memory lines can be compressed to 1, 2, 3, or 4 memory lines, for example where 4 means uncompressed. Thus, for 4:N compression, 2 bits are used for every four memory lines to signal the degree of compression. Similarly, for M:N compression, $\log_2 M$ bits are used to signal the degree of compression for every M memory lines.

The total number of memory lines in a page is L (e.g., for a 1 kB page and 64 B memory lines, L=1,024/64=16). Now, the required number of compression control bits per page table entry (PTE) or TLB entry is:

$$\#bits = (L/M) \times \log_2 M$$

Assuming 1 kilobyte pages, 64 byte memory lines, and 8:N compression, the number of bits is $((1,024/64)/8) \times 3 = 6$. For a 4 kilobyte page and 64 byte memory lines, and 4:N compression, the number of bits=$((4,096/64)/4) \times 2 = 32$, and so on.

Apart from compression control, telling if and to what extent the data in the memory page is compressed, there is also a need to designate a particular coder/decoder (codec) for compressed data. The assumption here is that the same codec is used for the whole mapped page. A single small identifier is used per page table and TLB entry. If there are four types of codecs (e.g., color, depth, video, none), $\log_2 4 = 2$ bits are necessary to indicate which codec was used.

In one embodiment, the routing information is set up once, when the data is allocated. At allocation, it is known which type of data is going to be stored in the buffer. Another option is to let the user specify the codec associated with a particular buffer or even a particular memory page. If the codec for a buffer is changed during the lifetime of the buffer, the data is first decompressed with the old codec and then compressed using the new codec.

Routing information is only needed in a system where data is shared between different subsystems in a way that the context in which the data is accessed does not explicitly indicate a particular codec. An example of a situation where routing information is unnecessary is static textures, which are only accessed by the sampler in the GPU. There is consequently no need to indicate a codec since all static texture data is only accessed by the sampler.

An efficient location for compression control data is directly in the TLB. Other options include storing the data in another hardware unit on-chip. The same is true for the page table, which contains all memory mappings, making it the most suitable location for compression control. Again, however, another option is storing compression control in separate buffers.

FIG. 1 is an example compression control surface for a memory page size of 4 kilobytes and a memory line size of 64 bytes. With 2:N compression, 16 bits are needed to signal the compression state (i.e., whether 128 bytes have been compressed down to 64 bytes or not), and in this example, 3 bits are used for codec routing, allowing $2^3=8$ different codecs.

FIG. 2 is an example of TLB layout with 8 entries. A TLB may be extended with the rightmost column, titled compression control and routing. As shown in FIG. 1, compression control is a vector of bits indicating whether a compressible unit is compressed or not, while the routing information indicates which codec is to be used when this data is uncompressed.

FIG. 3 shows an example system with a CPU and/or a GPU 10 accessing memory 12, given by a virtual address 14. The virtual address is split into a virtual page number 16 and an offset 18, where the page number is used to find the corresponding physical page number in the TLB 20. When found, the physical page number 22, together with the offset 18, forms the physical address 24 that is sent to the cache system 26.

Before data is retrieved from memory, the data is decompressed in the codec 28 if the compression control surface indicates that the corresponding data indeed was compressed. Similarly, before data is written, the codec 28 may attempt to compress the data and write out the data in compressed form (if compressed succeeded, otherwise, it will fall back to writing uncompressed data). The success of the compression algorithm, in terms of the resulting number of memory lines, is recorded in the compression control bits.

Figure 4:
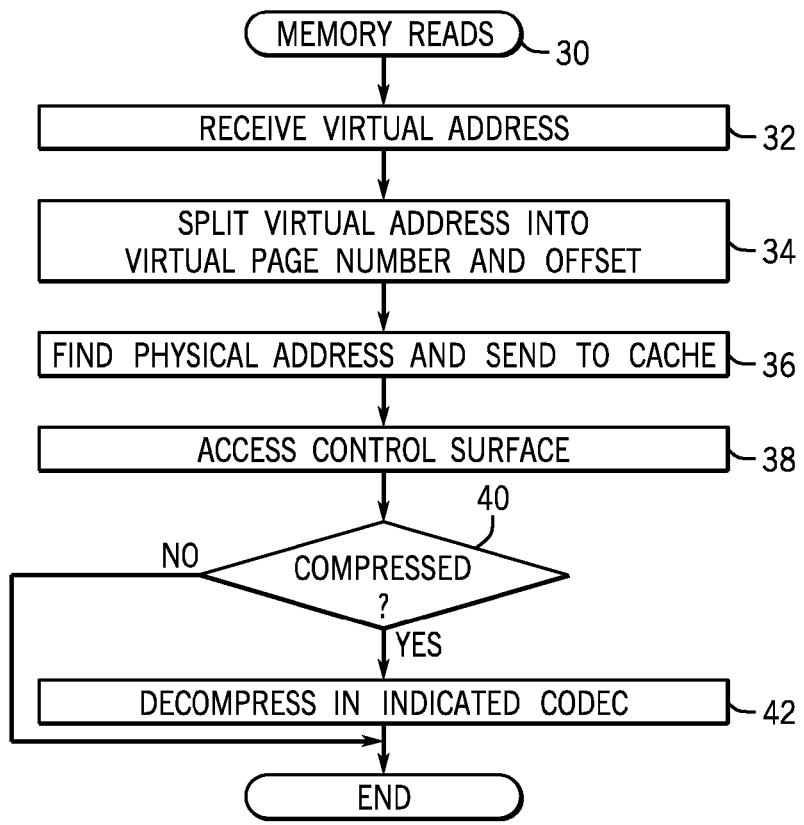
FIG. 4 is a flow chart for a memory read according to one embodiment.
Figure 5:
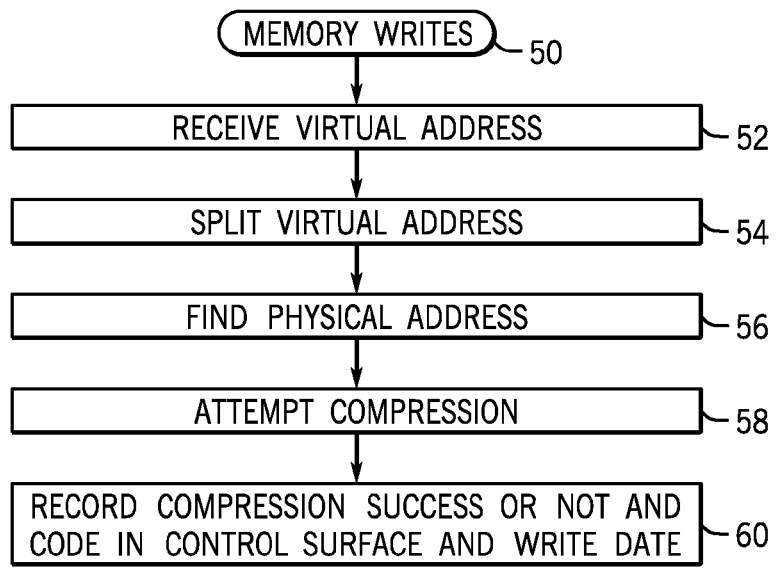
FIG. 5 is a flow chart for a memory write according to one embodiment.

The sequences of FIGS. 4 and 5 are applicable to memory reads and memory writes respectively using compression control surfaces. They may be implemented in hardware, software and/or firmware. In software and firmware embodiments they may use computer implemented instructions stored in one or more non-transitory computer readable media. For example, the sequences may be part of the central processing unit or graphics processing unit or both.

The sequence 30 shown in FIG. 4 may be used for memory reads. A virtual address is received as indicated in block 32. Then the virtual address is split into a virtual page number and an offset as indicated in block 34. This information is used to find a physical address and send it to cache as indicated block 36.

Then an access control surface is accessed as indicated in block 38. If the access control surface indicates that the data was compressed as determined in diamond 40 then the data may be decompressed using the codec indicated in the control surface as indicated in block 42.

The write sequence 50 shown in FIG. 5 begins by receiving the virtual addresses as indicated in block 52, splitting the virtual addresses as indicated in block 54 and finding the physical addresses indicated in block 56. Then compression is attempted as indicated in block 58. If compression is successful, the compression's success is recorded in the control surface together with the codec that was used for compression and then the data is written as indicated in block 60.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

Figure 6:
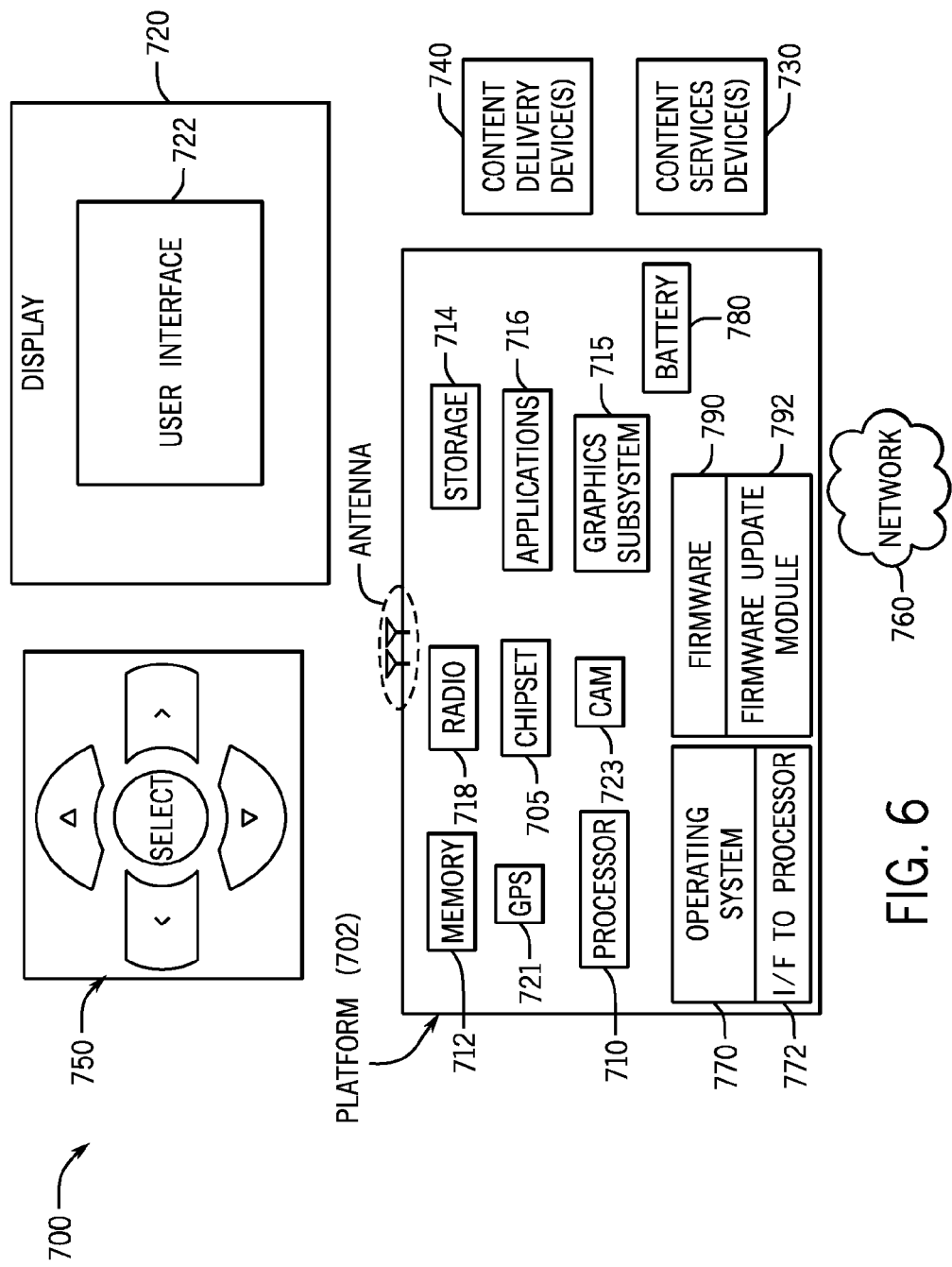
FIG. 6 is a system depiction for one embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 4 and 5 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit the applicable embodiments.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to be scope limiting.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
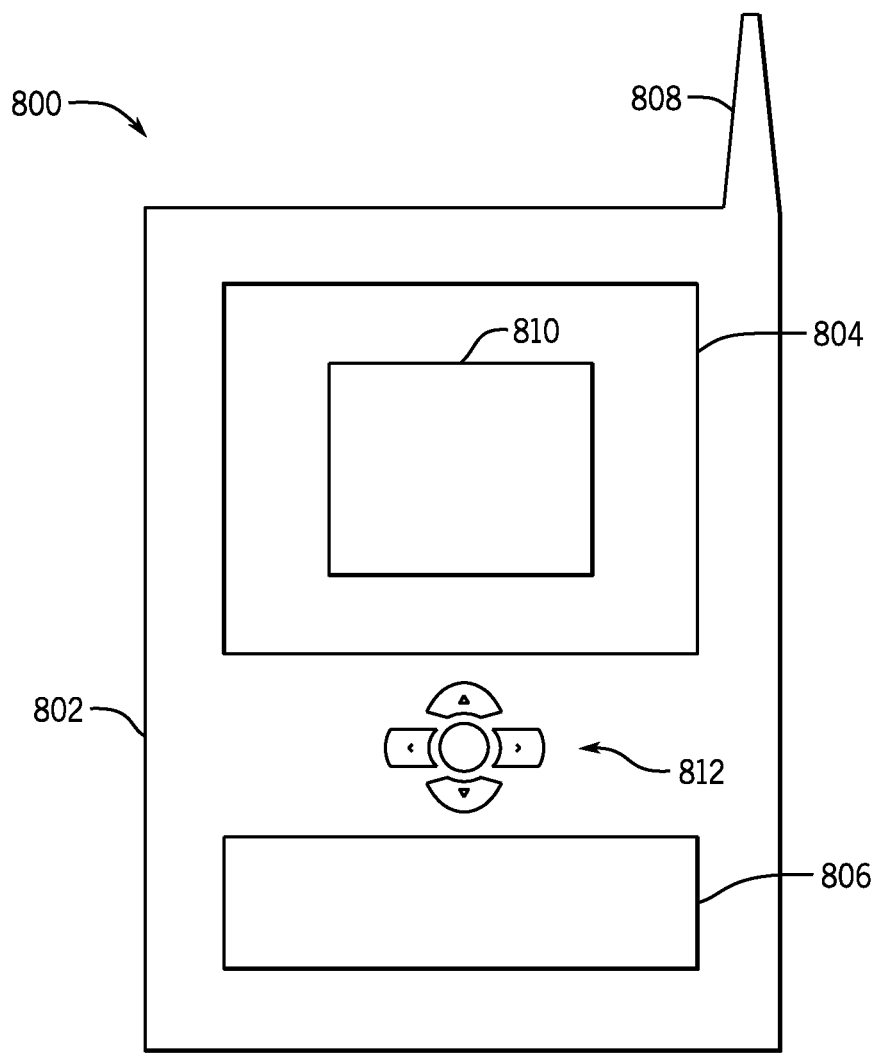
FIG. 7 is a front elevational view of one embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The following clauses and/or examples pertain to further embodiments:

One example embodiment may be a method comprising recording whether compression is successful and if so, recording a codec used for compression of data in a control surface, and writing the data to memory. The method may also include reading data by accessing the control surface. The method may also include using a single bit per compressible unit to indicate whether the unit is compressed. The method may also include using the same control surface coding for both central processing and graphics processing units. The method may also include providing $(L/M) \times \log_2 M$ compression control bits per entry, where L is total number of memory lines in a page and M is the number of memory lines in the compressible unit. The method may also include coding codecs in said surface by type including one or more of color, depth or video codecs. The method may also include storing the surface on a translation lookaside buffer.

Another example embodiment may be one or more non-transitory computer readable media storing instructions executed by a processor to perform a sequence comprising recording whether compression is successful and if so, recording a codec used for compression of data in a control surface, and writing the data to memory. The media may further store a sequence including reading data by accessing the control surface. The media may further store a sequence including using a single bit per compressible unit to indicate whether the unit is compressed. The media may further store a sequence including using the same control surface coding for both central processing and graphics processing units. The media may further store a sequence including providing $(L/M) \times \log_2 M$ compression control bits per entry, where L is total number of memory lines in a page and M is the number of memory lines in the compressible unit. The media may further store a sequence including coding codecs in said surface by type including one or more of color, depth or video codecs. The media may further store a sequence including storing the surface on a translation lookaside buffer.

In another example embodiment may be an apparatus comprising a processor to record whether compression is successful and if so, record a codec used for compression of data in a control surface, and write the data to memory, and a memory coupled to said processor. The apparatus may include said processor to read data by accessing the control surface. The apparatus may include said processor to use a single bit per compressible unit to indicate whether the unit is compressed. The apparatus may include said processor to use the same control surface coding for both central processing and graphics processing units. The apparatus may include said processor to provide $(L/M) \times \log_2 M$ compression control bits per entry, where L is total number of memory lines in a page and M is the number of memory lines in the compressible unit. The apparatus may include said processor to code codecs in said surface by type including one or more of color, depth or video codecs. The apparatus may include said processor to store the surface on a translation lookaside buffer. The apparatus may include a display communicatively coupled to the processor. The apparatus may include a battery coupled to the processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:
1. A method comprising:
   determining whether compression is successful; and
   recording whether compression was successful on a control surface in a memory accessible by a graphics processing unit and a central processing unit by providing $(L/M) \times \log_2 M$ compression control bits per entry, where L is total number of memory lines in a page and M is the number of memory lines in the compression unit.
2. The method of claim 1 including, if compression is successful, recording a codec used for compression in the control surface.

3. The method of claim 1 including reading data by accessing the control surface.

4. The method of claim 1 including using a single bit per compressible unit to indicate whether the unit is compressed.

5. The method of claim 1 including using the same control surface coding for both central processing and graphics processing units.

6. The method of claim 1 including coding codecs in said surface by type including one or more of color, depth or video codecs.

7. The method of claim 1 including storing the surface on a translation lookaside buffer.

8. The method of claim 1 including storing the surface for control by a page table.

9. The method of claim 8 including storing the surface in the page table.

10. One or more non-transitory computer readable media storing instructions executed by a processor to perform a sequence comprising:

recording whether compression is successful; and recording whether compression was successful on a control surface in a memory accessible by a graphics processing unit and a central processing unit by providing $(L/M) \times \log_2 M$ compression control bits per entry, where L is total number of memory lines in a page and M is the number of memory lines in the compression unit.

11. The media of claim 10, said sequence including reading data by accessing the control surface.

12. The media of claim 10, said sequence including using a single bit per compressible unit to indicate whether the unit is compressed.

13. The media of claim 10, said sequence including using the same control surface coding for both central processing and graphics processing units.

14. The media of claim 10, said sequence including coding codecs in said surface by type including one or more of color, depth or video codecs.

15. The media of claim 10, said sequence including storing the surface on a translation lookaside buffer.

16. An apparatus comprising:

a processor to record whether compression is successful, and record whether compression was successful on a control surface in a memory accessible by a graphics processing unit and a central processing unit by providing a number of compression control bits per page table entry, said number determined based on an even number of memory lines in a page and a number of memory lines in a compression unit to provide $(L/M) \times \log_2 M$ compression control bits per entry, where L is total number of memory lines in a page and M is the number of memory lines in the compression unit; and a memory coupled to said processor.

17. The apparatus of claim 16, said processor to read data by accessing the control surface.

18. The apparatus of claim 16, said processor to use a single bit per compressible unit to indicate whether the unit is compressed.

19. The apparatus of claim 16, said processor to use the same control surface coding for both central processing and graphics processing units.

20. The apparatus of claim 16, said processor to code codecs in said surface by type including one or more of color, depth or video codecs.

21. The apparatus of claim 16, said processor to store the surface on a translation lookaside buffer.

22. The apparatus of claim 16 including a display communicatively coupled to the processor.

23. The apparatus of claim 16 including a battery coupled to the processor.

* * * * *